(12) United States Patent
Okada et al.

(10) Patent No.: US 6,844,292 B1
(45) Date of Patent: Jan. 18, 2005

(54) METHOD FOR PREPARING CATALYST FOR REFORMING METHANOL

(75) Inventors: Osamu Okada, Osakasayama (JP); Mitsuaki Echigo, Kyotanabe (JP)

(73) Assignee: Osaka Gas Co., Ltd., Osaka (JP)

( * ) Notice: Subject to any disclaimer, the term of this patent is extended or adjusted under 35 U.S.C. 154(b) by 0 days.

(21) Appl. No.: 10/258,094

(22) PCT Filed: Apr. 19, 2000

(86) PCT No.: PCT/JP00/02535
§ 371 (c)(1), (2), (4) Date: Oct. 18, 2002

(87) PCT Pub. No.: WO01/78892
PCT Pub. Date: Oct. 25, 2001

(51) Int. Cl.$^7$ .............................................. B01J 23/02
(52) U.S. Cl. ...................................... 502/342; 502/346
(58) Field of Search .................................. 502/342, 346

(56) References Cited

U.S. PATENT DOCUMENTS

| | | | | |
|---|---|---|---|---|
| 3,988,263 A | * | 10/1976 | Hansford | 252/466 J |
| 4,048,196 A | * | 9/1977 | Broecker et al. | 260/346.11 |
| 4,600,704 A | * | 7/1986 | Jennings | 502/318 |
| 4,729,979 A | * | 3/1988 | Zletz | 502/202 |
| 4,871,710 A | * | 10/1989 | Denny et al. | 502/414 |
| 5,128,307 A | * | 7/1992 | Wanjek et al. | 502/342 |
| 5,453,412 A | * | 9/1995 | Deckers et al. | 502/342 |
| 5,767,039 A | * | 6/1998 | Yamagishi et al. | 502/342 |
| 6,051,163 A | * | 4/2000 | Kumberger et al. | 252/373 |

FOREIGN PATENT DOCUMENTS

| JP | 59-189937 | 10/1984 |
|---|---|---|
| JP | 3-52643 | 3/1991 |
| JP | 05-305234 | 11/1993 |
| JP | 06-256001 | 9/1994 |
| JP | 07-024320 | 1/1995 |
| JP | 11-244700 | 9/1999 |
| JP | 2000-117107 | 4/2000 |

* cited by examiner

*Primary Examiner*—Steven Bos
*Assistant Examiner*—Edward M. Johnson
(74) *Attorney, Agent, or Firm*—Webb Ziesenheim Logsdon Orkin & Hanson, P.C.

(57) ABSTRACT

In a method of manufacturing a copper-zinc-aluminum-based methanol reforming catalyst by coprecipitation, the methanol reforming catalyst is obtained by using a copper compound, a zinc compound and aluminum hydroxide, mixing them with an alkaline substance to produce a precipitate, calcining the precipitate obtained, and reducing the calcined product. Thus, a method is provided for manufacturing a highly active, highly heat resistant and durable methanol reforming catalyst which can be used for a long time even under reaction conditions of 300° C. and higher.

4 Claims, 1 Drawing Sheet

METHOD FOR PREPARING CATALYST FOR REFORMING METHANOL

BACKGROUND OF THE INVENTION

1. Field of the Invention

The present invention relates to a method of manufacturing a methanol reforming catalyst, and more particularly relates to a method of manufacturing a highly active and durable catalyst in a technique of manufacturing a reforming gas containing hydrogen as a main ingredient by reacting methanol with steam (or steam and air, depending on cases).

2. Description of the Prior Art

It has been well known that methanol is relatively easily reformed, in the presence of a catalyst, to a gas having hydrogen as a main ingredient. Particularly recently, a steam reforming of methanol has been attracting attention as a hydrogen supplying technique for comparatively small-scale fuel cells. The steam reforming reaction of methanol is expressed by the following formula (A), and its elementary processes in formulae (B) and (C):

$$CH_3OH + H_2O \rightarrow CO_2 + 3H_2 - 11.8 \text{ kcal/mol} \quad (A)$$

$$CH_3OH \rightarrow CO + 2H_2 - 21.7 \text{ kcal/mol} \quad (B)$$

$$CO + H_2O \rightarrow CO_2 + H_2 + 9.9 \text{ kcal/mol} \quad (C)$$

As methanol reforming catalysts, precipitation catalysts of e.g. copper, nickel, chrome, zinc and aluminum oxides have been proposed hitherto as described in Japanese Patent Publication (Unexamined) H3-52643 and Japanese Patent Publication (Unexamined) H5-305234, for example. In these techniques, aluminum nitrate is mainly used as aluminum material and is considered desirable for catalyst production.

In contrast to the steam reforming of natural gas, naphtha and so on, the steam reforming of methanol, which does not require additional equipment for a desulfurizing process or water-gas shift reaction process, is attracting widespread attention as a hydrogen supplying technique for mobile fuel cells such as for use on automobiles, and for stationary fuel cells of comparatively small scale. Since adaptability to load variations and long-term durability are required in these applications, it is essential to improve heat resistance and durability of the catalysts.

Methanol reforming catalysts manufactured by a conventional coprecipitation method are unsatisfactory with respect to heat resistance, and the catalyst activity thereof reduces continuously when used for a long time. This drawback is particularly outstanding under conditions of a reaction temperature of about 300° C. or higher, and the durability of the catalysts at such temperature is extremely low. This problem is particularly outstanding when aluminum nitrate is used as a source of aluminum as described hereinafter on the basis of test results.

Further, in a reaction in which the steam reforming of methanol is combined with partial combustion, the reaction temperature may rise even higher. Thus it is necessary to develop a catalyst durable for a long period of time even when used at a temperature in the order of 300 to 400° C.

Thus, the object of the present invention is to provide a method of manufacturing a highly active, highly heat resistant and durable methanol reforming catalyst which can be used for a long time even under reaction conditions of 300° C. and higher.

DISCLOSURE OF THE INVENTION

The characterizing features of a method of manufacturing a methanol reforming catalyst according to the present invention for fulfilling the above object are the first through fifth features described hereinafter.

The first feature lies in that, in a method of manufacturing a copper-zinc-aluminum-based methanol reforming catalyst by coprecipitation, a copper compound, a zinc compound and aluminum hydroxide are used and mixed with an alkaline substance by a mixing operation such as stirring to produce a precipitate, and the precipitate obtained is calcined under a calcination temperature condition higher than 380° C. and not exceeding 650° C.

SUMMARY OF THE INVENTION

With this feature, also with the method of the present application in which a copper-zinc-aluminum-based methanol reforming catalyst is obtained, coprecipitation is employed, however, aluminum hydroxide is used as an aluminum source instead of using aluminum nitrate as used in conventional methods. Further, as in the conventional methods, a copreciptate of copper, zinc and aluminum is obtained, which is then calcined to produce a predetermined catalyst.

It is considered that, by using aluminum hydroxide as an aluminum source, as noted above, instead of aluminum nitrate usually used as salt, copper is uniformly dispersed to prevent sintering, and heat resistance and durability are improved.

Further, with regard to calcination temperature, when the temperature is 380° C. or below, calcination is insufficient and tends to result in poor heat resistance and durability, and when higher than 650° C., calcination may be excessive. Both cases are undesirable.

When the above technique is employed, as the second feature in addition to the first feature, it is preferable to make a compounding ratio of copper, zinc and aluminum, in an atomic ratio of metal atoms, 1:03 to 10:0.05 to 2.

When the quantity of zinc is too small, copper sintering cannot easily be prevented with effect, and when the quantity of zinc is too large, the methanol reforming catalyst tends to be poor in performance.

On the other hand, when the quantity of aluminum is too small, Cu—ZnO composition cannot be stabilized, and when the quantity of aluminum is too large, the methanol reforming catalyst tends to be poor in performance as in the case of zinc quantity.

Further, when reducing the catalyst, as the third feature, the calcined product provided by the calcination in the first feature noted above, preferably, is reduced by hydrogen at 150° C. to, but not exceeding, 300° C. As the fourth feature, the calcined product provided by the calcination in the first feature, preferably, is hydrogen-reduced by hydrogen gas diluted with an inert gas to a hydrogen concentration not exceeding 6%.

In the hydrogen reduction process which is an exothermic reaction, because of the low melting point of copper, the particle diameter tends to be increased and the surface area decreased by heat. Further, excessive heat may subtly change the porous structure, which results in a major change in property of the methanol reforming catalyst. Thus, when the mixed oxide is reduced by hydrogen, it is preferable to conduct the hydrogen reduction of copper oxide, which is an exothermic reaction, under mild conditions. By selecting the temperature range and hydrogen concentration noted above, the reduction can be conducted under mild conditions. However, the methanol reforming catalyst manufactured according to the invention is superior in durability to conventional catalysts, and therefore is resistant to the heat generated during the reduction process. The reduction can be conducted without so much care as in the conventional methods. This is another advantage of the present application.

DETAILED DESCRIPTION OF THE PREFERRED EMBODIMENTS

Figure 1:
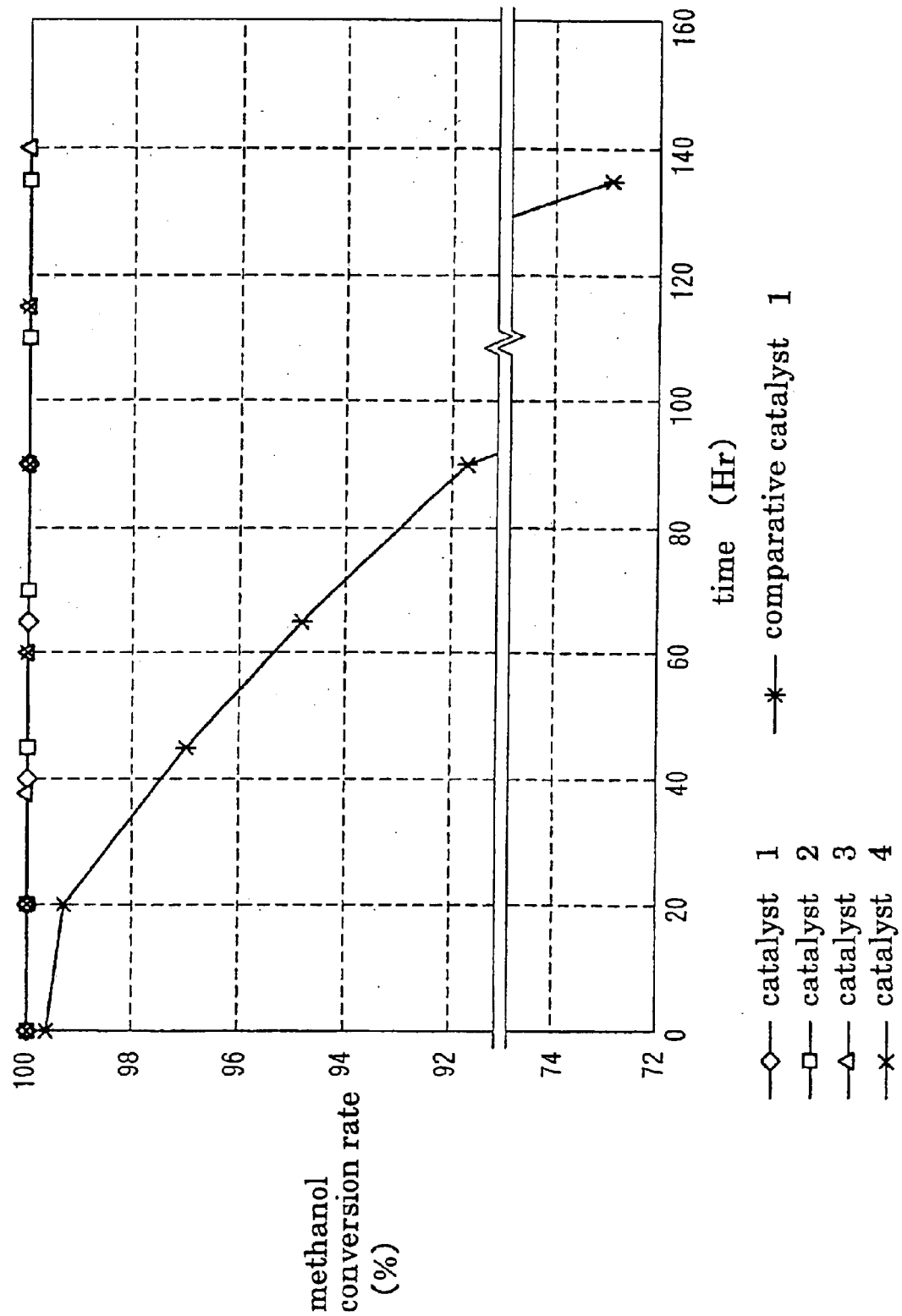
FIG. 1 is a view showing durability test results of methanol reforming catalysts.

A method of manufacturing a copper-zinc-aluminum-based methanol reforming catalyst (i.e. a methanol reforming catalyst containing copper, zinc and aluminum oxides as main ingredients) according to the present invention can be executed in various ways as described hereinafter, for example.

A mixed solution, prepared by adding aluminum hydroxide to an aqueous solution containing a copper compound (e.g. copper nitrate or copper acetate) and a zinc compound (e.g. zinc nitrate or zinc acetate), is, while being stirred, dripped into an aqueous solution of an alkaline substance (e.g. sodium carbonate or potassium carbonate) kept at a temperature of about 60° C. to produce a precipitate.

The process of adding the mixed solution for manufacturing the precipitate can be conducted in a reverse order, that is, copper, zinc and aluminum compounds can be added to the solution of the alkaline substance. Further, aluminum hydroxide can be added to the solution of the alkaline substance in advance, and the solution containing the copper compound and zinc compound can be mixed therein to produce the precipitate.

The produced precipitate is sufficiently cleaned with water, then filtered and dried. Next, by calcining this at a temperature in the range higher than 380° C. and not exceeding 650° C., a sintered product of copper oxide-zinc oxide-aluminum oxides is obtained. After an additive (e.g. graphite) is added as necessary, the sintered product obtained is molded into a shape such as of a tablet or an extrusion. It is preferable that the calcination temperature is in the range higher than 380° C. and not exceeding 550° C.

The above sintered product has a compounding ratio of copper oxide, zinc oxide and aluminum oxide, in an atomic ratio of metal atoms: copper, zinc, aluminum as 1:0.3 to 10:0.05 to 2, preferably about 1:0.6 to 3:0.3 to 1.

Next, the mixed oxide resulting from the above processes is subjected to a hydrogen reduction as necessary. In the hydrogen reduction process, because of the low melting point of copper, the particle diameter tends to be increased and the surface area decreased by heat. Further, excessive heat may subtly change the porous structure, which results in a major change in property of the methanol reforming catalyst. Thus, when the mixed oxide is reduced by hydrogen, it is preferable to conduct the hydrogen reduction of copper oxide, which is an exothermic reaction, under mild conditions.

For example, it is preferable to conduct the reduction in the presence of hydrogen gas diluted with a gas not involved in the reaction (e.g. nitrogen gas, argon gas or methane gas) to have a hydrogen content of 6% or less, preferably about 0.5 to 4%, by volume, while maintaining the temperature at about 150 to 300° C. As a gas not involved in the reaction, in particular, an inert gas such as nitrogen gas is suitable for use.

The copper-zinc-aluminum-based methanol reforming catalyst provided by the above method has a dense structure consisting of an agglomerate of fine particles. Extremely small copper particles are uniformly dispersed over the surfaces of zinc oxide particles, and maintained in a highly activated state by a chemical interaction with zinc oxide.

On the other hand, the aluminum oxide is distributed all over, keeping the copper particles and zinc oxide particles from sintering under the heat, to be in a highly active state. Thus, when these methanol reforming catalysts are used, high catalytic activity can be maintained for a long time even at a comparatively high temperature of 300° C. or above and under high LHSV conditions.

Embodiments of preparing methanol reforming catalysts according to the above technique, and a comparative example according to a conventional technique will be described hereinafter in the order of manufacturing method first and then properties.

1. Preparation of Reforming Catalysts (Embodiment 1)

Aluminum hydroxide is added to an aqueous solution of sodium carbonate and, while keeping the temperature thereof at 60° C., a mixed solution containing copper nitrate and zinc nitrate, while being stirred, is slowly dripped to form a precipitate. Thereafter the precipitate is sufficiently washed, then filtered and dried.

Next, this is calcined at the temperature of 550° C. for three hours, to obtain Catalyst 1 containing copper oxide-zinc oxide-aluminum oxide in a molar ratio of 1:10.2.

(Embodiment 2)

Aluminum hydroxide is added to an aqueous solution of sodium carbonate and, while keeping the temperature thereof at 60° C., a mixed solution containing copper nitrate and zinc nitrate, while being stirred, is slowly dripped to form a precipitate. Thereafter the precipitate is sufficiently washed, then filtered and dried.

Next, this is calcined at the temperature of 550° C. for three hours, to obtain Catalyst 2 containing copper oxide-zinc oxide-aluminum oxide in a mole ratio of 1:2:0.5.

(Embodiment 3)

In contrast to Embodiment 1, only the precipitate calcination temperature is changed to 450° C., to obtain Catalyst 3.

(Embodiment 4)

In contrast to Embodiment 1, only the precipitate calcination temperature is changed to 350° C., to obtain Catalyst 4.

COMPARATIVE EXAMPLE 1

A mixed aqueous solution containing copper nitrate, zinc nitrate and aluminum nitrate in a molar ratio of 1:1:0.2, while being stirred, is dripped to an aqueous solution of sodium carbonate kept at the temperature of about 60° C., to form a precipitate. Thereafter the precipitate is sufficiently washed, then filtered and dried.

Next, this is calcined at the temperature of 550° C. for three hours to obtain Comparative Catalyst 1.

2. Catalyst Properties

Property Confirmation Test 1

Nitrogen gas containing 2% by volume of hydrogen is passed over 7.6 cc each of the catalysts obtained in Embodiments 1 through 4 and Comparative Example 1, and the catalysts are respectively reduced at the temperature of 250° C. Then a steam reforming reaction of methanol is carried out by passing a raw material gas with an S/C (molar ratio of steam/methanol)=2 through catalyst layers under the conditions of LHSV (methanol feeding rate (Liquid, Howly, Space, Velocity))=5h$^{-1}$ and reaction pressure being at atmospheric pressure. Table 1 shows the catalytic activities at 300° C., 350° C. and 400° C. of each catalyst obtained (methanol conversion rate, 1−[CH$_3$OH]/([CO$_2$]+[CO]+[CH$_3$OH]), where [ ] shows each ingredient concentration in the gas after the reaction).

TABLE 1

LHSV (methanol feeding rate) = 5 h$^{-1}$

| | Methanol conversion rate (%) | | |
|---|---|---|---|
| | 300° C. | 350° C. | 400° C. |
| Catalyst 1 | 95.1 | 98.4 | 100 |
| Catalyst 2 | 95.2 | 100 | 100 |
| Catalyst 3 | 93.9 | 100 | 100 |
| Catalyst 4 | 94.8 | 100 | 100 |
| Comparative catalyst 1 | 64.4 | 89.0 | 99.7 |

As a result, the catalysts manufactured by the invention are found to show higher methanol conversion rates than the comparative catalyst.

Property Confirmation Test 2

Nitrogen gas containing 2% by volume of hydrogen is passed over 7.6 cc each of the catalysts obtained in Embodiments 1 through 4 and Comparative Example 1, and the catalysts are respectively reduced at the temperature of 250° C. Then a steam reforming reaction of methanol is carried out by passing a raw material gas with an S/C (molar ratio of steam/methanol)=2 through catalyst layers under the conditions of LHSV (methanol feeding rate)=5h$^{-1}$ and reaction pressure being at atmospheric pressure. A durability test is conducted at the reaction temperature of 400° C. The results are shown in Table 2 and FIG. 1. In the Table, the time indicates Hr and the conversion rate indicates %. Further, in the Figure, the horizontal axis represents time while the vertical axis represents methanol conversion rates. According to the results, Catalysts 1 through 4, which are objects of this application, show no decline in the conversion rate, whereas the Comparative Catalyst using aluminum nitrate as aluminum source shows a distinct decline.

TABLE 2

| Catalyst 1 | time | 0 | 20 | 40 | 65 | 90 | |
|---|---|---|---|---|---|---|---|
| | conversion rate | 100 | 100 | 100 | 100 | 100 | |
| Catalyst 2 | time | 0 | 20 | 45 | 70 | 110 | 135 |
| | conversion rate | 100 | 100 | 100 | 100 | 100 | 100 |
| Catalyst 3 | time | 0 | 20 | 60 | 90 | 115 | 140 |
| | conversion rate | 100 | 100 | 100 | 100 | 100 | 100 |
| Catalyst 4 | time | 0 | 20 | 60 | 90 | 115 | |
| | conversion rate | 100 | 100 | 100 | 100 | 100 | |
| Comparative catalyst 1 | time | 0 | 20 | 45 | 65 | 90 | 135 |
| | conversion rate | 99.7 | 99.4 | 96.9 | 94.8 | 91.7 | 72.8 |

INDUSTRIAL UTILITY

According to the present invention, methanol reforming catalysts of high heat resistance and high activity can be obtained. Thus the catalysts provided have high activity and long life even under the conditions of high reaction temperature and high LHSV (methanol feeding rate).

What is claimed is:

1. A method of manufacturing a copper-zinc-aluminum-based methanol reforming catalyst by coprecipitation, the method of manufacturing the methanol reforming catalyst consisting essentially of the steps of:
   providing a copper compound, a zinc compound and aluminum hydroxide;
   mixing the copper compound, the zinc compound and the aluminum hydroxide with an alkaline substance to produce a precipitate; and
   calcinating the precipitate under a calcination temperature condition higher than 380° C. and not exceeding 650° C.

2. The method of manufacturing a methanol reforming catalyst as defined in claim 1, wherein a compounding ratio of copper, zinc and aluminum is, in an atomic ratio of metal atoms, 1:0.3 to 10:0.05 to 2.

3. The method of manufacturing a methanol reforming catalyst as defined in claim 1 further including the step of reducing a calcined product obtained by said calcination by hydrogen at 150° C. to, but not exceeding, 300° C.

4. The method of manufacturing a methanol reforming catalyst as defined in claim 1, further including the step of hydrogen-reducing a calcined product obtained by said calcination by hydrogen gas diluted with an inert gas to a hydrogen concentration not exceeding 6%.

* * * * *